Patented Oct. 11, 1938

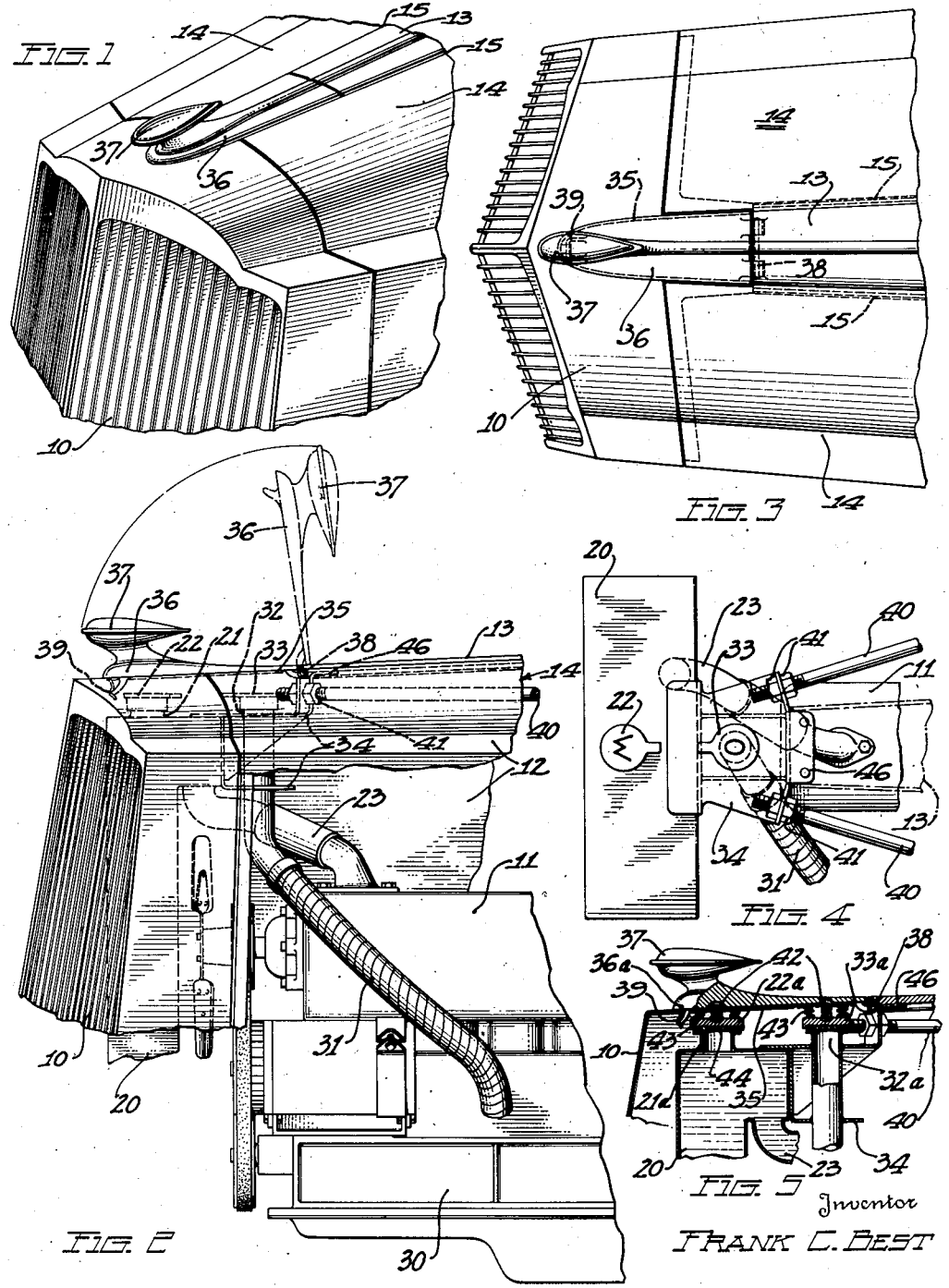

2,132,926

UNITED STATES PATENT OFFICE 2,132,926

MOTOR VEHICLE

Frank C. Best, Detroit, Mich., assignor to Packard Motor Car Company, Detroit, Mich., a corporation of Michigan Application January 27, 1936, Serial No. 61,027

4 Claims. (Cl. 180—69)

This invention relates to motor vehicles and particularly to means for providing easy access to water and oil filling openings thereof.

In conventional automotive vehicles water for the cooling system of the motor is ordinarily poured into the upper tank of the radiator through a cap covered opening located in the top of such tank, and oil for the crank case is poured directly into the crank case through a filler tube under the bonnet. There has lately been a tendency to place the radiator filler opening under the bonnet to eliminate theft of the various types of ornamental radiator caps and overflowing of anti-freezing solutions used in the radiator upon the painted surface of the bonnet, thus making it necessary to raise the bonnet in order to gain access thereto. The primary object of the present invention is to obviate the necessity for raising the bonnet when the oil and water supply of the motor are replenished, while at the same time having the filler openings concealed. With the present device it is contemplated to employ a convenient opening in a stationary part of the bonnet with a decorative hinged cover to provide access to the water and oil conduits of the motor.

The present invention is employed in conjunction with the centrally located stationary part of the bonnet so as not to interfere with raising the hood when such is required.

A further object is to provide a device which performs a decorative and utilitarian purpose as an integral part of the bonnet of an automobile and which is practically free of any parts that are apt to get out of order or lack dependability in operation.

Another object is to provide an integral support for the oil and water conduits of a motor vehicle.

Other objects will be apparent from the following description and claims when considered together with the accompanying drawing, in which—

Fig. 1 is a perspective view of the front end of an automobile embodying my invention;

Fig. 2 is a side view;

Fig. 3 is a top plan view;

Fig. 4 is a plan view with the bonnet and radiator casing removed; and

Fig. 5 shows another form of the removable cover.

Referring to the drawing, 10 represents the radiator casing of a motor vehicle and 11 is the motor or engine thereof. 12 is a bonnet or hood forming a casing around the motor and in the form shown it comprises a stationary portion 13 and two movable portions 14 hinged to the stationary portion as at 15. The radiator casing 10 forms the forward part of this casing for the engine.

The engine 11 has the usual water circulating system for cooling it and part of this system is shown and includes the radiator 20 at the upper end of which is a filler tube or opening 21, and in the form shown in Figs. 1, 2, 3, and 4, this opening is provided with a cap 22 screwed on or otherwise secured over the opening. There is also a water conduit 23 leading from the engine water jacket to the radiator. The return conduit is not shown and does not form a part of the invention.

The engine is formed with the usual crank case 30 which is supplied with lubricant from time to time and for the purpose of refilling a filler tube 31 is provided. In this invention the tube extends upwardly from the crank case to a point adjacent the filler tube 21 of the radiator. The upper end of this oil filler tube is indicated at 32 and it has a cap 33 similar to the cap 22 for the water filler opening.

The filler tubes 21 and 32 are supported on an integral structure, shown in the drawing as comprising the upper part of the radiator and a bracket 34 secured thereto, and the filler openings of these tubes are arranged just beneath an opening 35 formed at the forward end of the stationary bonnet section 13 and the adjacent part of the radiator casing 10. A cover for this opening is indicated at 36 and is in the form of a base for an ornament 37, and it is hinged to the bonnet part 13 or to the bracket 34, as shown at 38. In Fig. 2 the cover 36 is shown in full lines in closed position where it is held by a catch 39, and in dotted lines the cover is in open position giving access to the upper ends of both filler tubes 21 and 32, so that the caps 22 and 33 thereof can be removed and the system supplied with water and oil, respectively. With this arrangement it is unnecessary to raise the bonnet when supplying the motor with water or oil.

The bracket 34 above referred to is also used for supporting the forward end of the part 13 of the bonnet, as at 46, and for the purpose of attaching the forward ends of brace rods 40, the rear ends of which rods are connected to the vehicle dash, not shown. The connection of the rods to the bracket is adjustable by reason of nuts 41. In the form of the invention shown in Fig. 5 the filler tubes 21a and 32a, instead of having screwed on caps, have their caps 22a and 33a mounted on the pivoted cover 36a. These caps 22a and 33a are loosely mounted on the cover as at 42 and springs 43 are provided to yieldingly press the caps over the openings. A lining material 44, such as rubber, is on the face of each of these caps in contact with the upper ends of the filler tubes. Thus when the cover 36a is moved to open position both of the filler tubes are open for filling, and as the cover is moved to its closed position both tubes are automatically closed.

It will be understood that various forms of the invention other than those described above may be used without departing from the spirit or scope of the invention.

What I claim is:

1. In a device of the class described the combination of a bonnet of an automobile having a stationary central part, a water filler conduit and oil filler conduit beneath said bonnet, said stationary part having an opening to permit access to said conduits, a removable cover over said opening, a bracket supporting the said oil filler conduit adjacent the water filler conduit, and also serving to support the forward end of the bonnet hinge plate, and at the same time as an anchor for the forward ends of the brace rods for the radiator shell.

2. In a motor vehicle, the combination of the water system and the engine oil system having filler conduits, and means for supporting said conduits with their openings adjacent each other, said means also supporting a portion of the vehicle bonnet and radiator brace rods.

3. In a motor vehicle, the combination with the engine having a crank case and a cooling water system, of a casing for the engine comprising a stationary portion and a hinged bonnet portion, said casing leaving an opening not closed by said bonnet, conduits from the crank case and the water system of the engine having filling openings located in the opening in said casing, said filling openings being adjacent to each other, a movable hinged cover for the casing opening hinged to the stationary portion of the casing, and caps mounted on the inside face of the cover and arranged to tightly close the filling openings as the cover is moved to closed position.

4. In a motor vehicle, the combination with the engine and its cooling water system, of a casing for the engine comprising a stationary portion and a hinged bonnet portion, said casing leaving an opening not closed by the bonnet portion, a conduit for the water system of the engine having a filling opening located for access through the opening in the casing, a cover for said casing opening hinged to the stationary portion of the casing, and a cap loosely mounted on said cover and arranged to yieldingly close the filling opening when the cover is closed.

FRANK C. BEST.